R. M. KEATING.
SPRING WHEEL.
APPLICATION FILED APR. 16, 1914.

1,207,928.

Patented Dec. 12, 1916.

WITNESSES:
A. C. Fairbanks
H. G. Cutter.

INVENTOR.
Robert M. Keating,
BY
Webster & Co.,
ATTORNEYS.

UNITED STATES PATENT OFFICE.

ROBERT M. KEATING, OF SPRINGFIELD, MASSACHUSETTS.

SPRING-WHEEL.

1,207,928.

Specification of Letters Patent.

Patented Dec. 12, 1916.

Application filed April 16, 1914. Serial No. 832,201.

*To all whom it may concern:*

Be it known that I, ROBERT M. KEATING, a citizen of the United States of America, residing at Springfield, in the county of Hampden and State of Massachusetts, have invented a new and useful Spring-Wheel, of which the following is a specification.

My invention relates to improvements in vehicle wheels in which springs are employed between the axis and rim of a wheel, and resides in one or more units interposed between the wheel hub and rim, each of such units being made up of a series or set of inner and a series or set of outer springs having rigid end attachments and the springs in each set being arranged in the form of an equilateral triangle. The two triangles comprised in each unit are so arranged relatively that each central diameter of the larger outer triangle bisects one side of the smaller inner triangle. When a plurality of units are provided, such units are arranged side by side or in different parallel planes, and with the angles of the larger or outer triangles equidistantly disposed in the circle formed by the rim of the wheel.

The objects of the invention are to construct a wheel in such a manner as to enable to be produced a yielding or resilient action between the hub and rim thereof, whereby the jar and vibration incident to the wheel when in operation will be absorbed within the wheel itself, instead of being transmitted to the vehicle and the occupants of the same, and to provide a wheel of this character that consists of few parts which may be readily replaced in case of accident, possesses the necessary strength and stability to render it available for commercial purposes, and has no parts to become loose and rattle.

Other objects and advantages will appear in the course of the following description.

I attain the objects and secure the advantages of my invention by the means illustrated in the accompanying drawings, in which—

Figure 1:
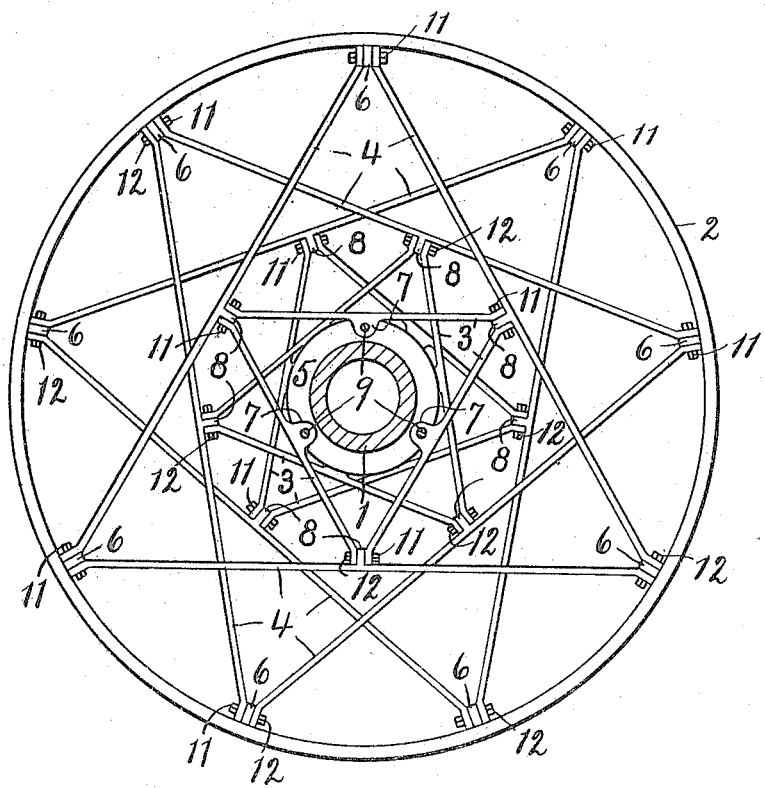
Figure 2:
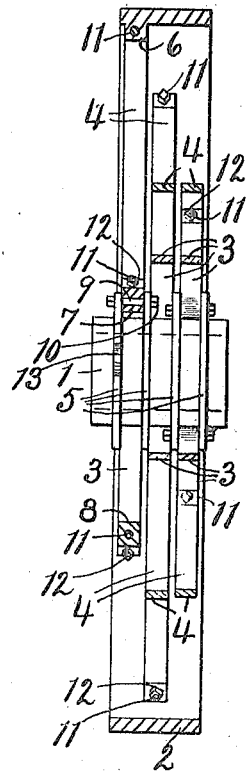

Figure 1 is a side elevation of a wheel which embodies a practical form of my invention, the hub of said wheel being cut away back of the foremost flange in order to show clearly the manner of securing the inner springs to the hub, and, Fig. 2, a central transverse vertical section through said wheel as it appears in the first view, the hub being in elevation.

Like numerals of reference designate like parts throughout the several views.

Although I have shown a wheel which includes three spring units, I do not desire or intend to confine myself to that number, because one or at most two of such units will be ample in many and indeed most cases, yet it is conceivable that even more than three units might be required under some conditions.

In the drawings a wheel is represented which comprises a hub 1, a rim 2, and three intermediate units each consisting of three short inner springs 3 and three long outer springs 4 together with the securing means therefor.

The hub 1 may be of any suitable construction, but should by preference be provided with a plurality of exterior flanges 5, or equivalent members, spaced to receive between them lugs 7 which are centrally located on the inner sides of the springs 3. The hub 1 for a wheel having a single spring unit requires but two flanges 5, and an additional flange 5 is required for every additional spring unit.

The rim 2 may be of any ordinary type, but is provided with a plurality of radial lugs 6, there being three of such lugs equidistantly disposed in the same plane with the annular space between each pair of adjacent flanges 5, for each spring unit. The radial planes of the whole number of lugs 6 are equidistant, so the major apexes of each unit in the present tri-unit construction are out of line laterally with the major apexes of any other unit and support the rim 2 or are supported thereon at points which taken all together are equidistant. The same thing would be true of a bi-unit construction, also of a construction in which more than three units were employed. Thus the rim support is evenly distributed, whether there be one or a plurality of units.

Each long spring 4 has a lug 8 in the center on the inner side thereof. The short springs 3, which form the inner triangle of each unit, have their lugs 7 inserted between two adjacent flanges 5 and rigidly secured thereto by bolts 9 and nuts 10, the former passing through the flanges and lugs, and said springs have their ends rigidly secured to the lugs 8 of the long springs 4, which form the outer triangle of such unit, by means of bolts 11 and nuts 12, the former passing through the short spring terminals and said lugs 8 which latter are between adjacent terminals.

The long springs 4, which form the outer triangle of each unit, in addition to having their lugs 8 bolted to the companion springs 3 or the latter bolted to the former, have their terminals rigidly secured to the lugs 6 by means of other bolts 11 and nuts 12, the attachment to said lugs 6 being of the same character as that of the said springs 3 to said lugs 8. Thus tight, strong and rigid connections are made as required at the center and circumference of the wheel and of each unit, and between the two triangles in each unit.

It is plainly to be seen that a wheel constructed in the manner described above is capable of yielding at practically all points, owing to the number and arrangement of the springs therein, and that such wheel is, nevertheless, strong and stable enough for all practical purposes. The hub flanges afford a most efficient anchorage or axial support for the spring unit or units, and preclude any chance of lateral displacement as well as of detachment in any other direction, and the rim and long spring lugs are quite as efficient as attaching points for the terminals of both the long and short springs.

Inasmuch as absolutely tight joints must be made and maintained in this wheel, the simple expedient for this purpose of resorting to lugs and bolts and nuts is found to be entirely adequate, although it is well known that more or less change in the lugs is quite within the range of one skilled in the art, and that some equivalent of the bolts and nuts might be used to advantage.

In order to insert the bolts 9 that hold the lugs 7 of the three central springs 3 in place between the two middle flanges 5, in this construction, openings may be provided in one of the end flanges 5 for the passage of said bolts, such an opening being indicated at 13 in Fig. 2.

What I claim as my invention, and desire to secure by Letters Patent, is—

1. A spring wheel comprising a hub provided with peripheral projecting members, a rim provided with interior radial members, an intermediate spring unit consisting of an inner triangle having substantially straight one-piece sides which are provided with interior lugs that extend between said peripheral hub members, and of an outer triangle having substantially straight one-piece sides which are provided with interior lugs, means rigidly to connect said inner triangle lugs with said peripheral hub members, means rigidly to connect said inner triangle at the angles with said outer triangle lugs, and means rigidly to connect said outer triangle at the angles with said radial rim members.

2. A spring wheel comprising a hub provided with peripheral projecting members, a rim provided with interior radial members arranged in sets of three and at equal distances apart, circumferentially of said rim, with said radial members in each set in off-set relationship to said radial members in any other set, intermediate spring units consisting of inner triangles having substantially straight one-piece sides which are provided with interior lugs that extend between said peripheral hub members, and of outer triangles having substantially straight one-piece sides which are provided with interior lugs, means rigidly to secure said inner triangle lugs to said peripheral hub members, means rigidly to secure said inner triangles at the angles to said outer triangle lugs, and means rigidly to secure said outer triangles at the angles to said radial rim members.

ROBERT M. KEATING.

Witnesses:
F. A. CUTTER,
A. C. FAIRBANKS.

Copies of this patent may be obtained for five cents each, by addressing the "Commissioner of Patents, Washington, D. C."